(12) United States Patent
Gao

(10) Patent No.: US 9,548,780 B2
(45) Date of Patent: Jan. 17, 2017

(54) SERVICE SHARING SYSTEM AND APPARATUS

(71) Applicant: HONGKONG UCLOUDLINK NETWORK TECHNOLOGY LIMITED, Hong Kong (CN)

(72) Inventor: Wen Gao, Hong Kong (CN)

(73) Assignee: HONGKONG UCLOUDLINK NETWORK TECHNOLOGY LIMITED, Hong Kong (CN)

( * ) Notice: Subject to any disclaimer, the term of this patent is extended or adjusted under 35 U.S.C. 154(b) by 367 days.

(21) Appl. No.: 14/160,978

(22) Filed: Jan. 22, 2014

(65) Prior Publication Data

US 2015/0171910 A1 Jun. 18, 2015

(30) Foreign Application Priority Data

Dec. 13, 2013 (CN) .......................... 2013 1 0685165

(51) Int. Cl.
| | |
|---|---|
| H04W 4/24 | (2009.01) |
| H04B 1/3816 | (2015.01) |
| H04L 29/06 | (2006.01) |
| H04W 12/06 | (2009.01) |
| H04W 88/06 | (2009.01) |
| H04W 60/00 | (2009.01) |

(52) U.S. Cl.
CPC ......... *H04B 1/3816* (2013.01); *H04L 63/0884* (2013.01); *H04W 4/24* (2013.01); *H04W 12/06* (2013.01); *H04W 60/00* (2013.01); *H04W 88/06* (2013.01)

(58) Field of Classification Search
CPC ....................................................... H04B 1/38
USPC .................................................. 455/406–411
See application file for complete search history.

(56) References Cited

U.S. PATENT DOCUMENTS

| | | | |
|---|---|---|---|
| 7,450,965 B2* | 11/2008 | Kim .................... | H04M 1/2745 455/407 |
| 2012/0129513 A1* | 5/2012 | van der Laak ....... | H04W 4/001 455/419 |
| 2013/0065557 A1* | 3/2013 | Zhang .................. | H04W 12/06 455/411 |

\* cited by examiner

*Primary Examiner* — Michael T Vu
(74) *Attorney, Agent, or Firm* — Leason Ellis LLP.

(57) ABSTRACT

A service sharing system and apparatus includes a subscriber identity information database that stores subscriber identity information of a subscriber whose service is to be shared; a scheduling management system that selects appropriate subscriber identity information from the subscriber identity information database according to the location of user equipment and the type of a service requested by the subscriber, and assigns the selected subscriber identity information to the subscriber; and a service access device that communicates with the scheduling management system according to the assigned subscriber identity information, and communicates with a service provider system corresponding to the assigned subscriber identity information to acquire the service requested by the subscriber. A subscriber acquires appropriate subscriber identity information as required and acquires an international, any-network, any-service provider, any-technology and mode, or any-service network access service.

6 Claims, 5 Drawing Sheets

SERVICE SHARING SYSTEM AND APPARATUS

CROSS-REFERENCE TO RELATED APPLICATIONS

This application claims priority to Chinese Patent Application No. 201310685165.2, filed before the Chinese Patent Office on Dec. 13, 2013 and entitled "SERVICE SHARING SYSTEM AND APPARATUS", which is incorporated herein by reference in its entirety.

FIELD OF THE INVENTION

Embodiments of the present invention relates to the field of communications technologies, and in particular, to a service sharing system and apparatus.

BACKGROUND OF THE INVENTION

At present, almost all the communication terminals, such as mobile phones, data cards, and hotspot devices, are capable of establishing connections with the corresponding service providers or networks using physical Subscriber Identity Module (SIM) cards inserted thereon. SIM is a unique authentication ID issued by a service provider for controlling access of a user equipment. The SIM enables the user equipment to enjoy data and voice services.

Typically, since the service provider is bound to the SIM in the device, one terminal may only use voice and data services provided by a service provider specified by the SIM. This brings many inconveniences to a subscriber. The subscriber cannot select services provided by an appropriate service provider according to signal strength and location information. When the subscriber is roaming, the subscriber may only select services provided by a service provider signing a roaming service agreement with the original service provider, and needs to pay service fees much more than a local subscriber. In addition, the package balance of the subscriber cannot be shared or exchanged to another subscriber; but only wasted; and when the package broadband traffic is insufficient, temporary services are very inconvenient for the subscriber.

Due to restriction of the tariff and package of the service provider, on-demand use of bandwidth cannot be practically implemented, but the fees are paid based on traffic. It is difficult for the subscriber to dynamically acquire desired services, for example, increased bandwidth and short message services, according to actual requirements.

SUMMARY OF THE INVENTION

Embodiments of the present invention provide a service sharing system to share services corresponding to subscriber identity information of an individual or a group subscriber.

An embodiment of the present invention provides a service sharing system, comprising:
a subscriber identity information database, configured to store subscriber identity information of a subscriber whose service is to be shared;
a scheduling management system, configured to select appropriate subscriber identity information from the subscriber identity information database according to the location of a user equipment and the type of a service requested by the subscriber, and assign the selected subscriber identity information to the subscriber; and
a service access device, configured to communicate with the scheduling management system to acquire the subscriber identity information assigned by the scheduling management system, and communicate with a service provider system corresponding to the subscriber identity information assigned by the scheduling management system to acquire the service requested by the subscriber.

An embodiment of the present invention provides a scheduling management system, comprising:
a subscriber access management unit, configured to receive a service request from a subscriber, assign subscriber identity information to the subscriber, and return the subscriber identity information to the subscriber; and
a subscriber identity information scheduling unit, configured to select the appropriate subscriber identity information according to the service request received by the subscriber access management unit, and return the appropriate subscriber identity information to the subscriber access management unit;
wherein the service request comprises the location of a user equipment and the type of the service requested by the subscriber.

An embodiment of the present invention provides a service access device comprising:
an access requesting unit, configured to send a service request from a subscriber, and acquire subscriber identity information assigned to the subscriber; and
a service access unit, configured to communicate with a service provider system corresponding to the subscriber identity information assigned to the subscriber to acquire the service requested by the subscriber.

An embodiment of the present invention provides a SIM-based service sharing system, comprising:
at least one SIM card read-and-write device, configured to simulate a read-and-write process performed by a local user equipment of a SIM card providing service sharing to a physical SIM card, wherein at least one SIM card providing service sharing are insertable in the at least one SIM card read-and-write device;
a SIM scheduling management system, configured to select appropriate SIM from the at least one SIM card inserted in the at least one SIM card read-and-write device according to the location of a user equipment and the type of a service requested by a subscriber, and assign the appropriate SIM to the subscriber; and
at least one multi-channel communication multi-channel communication, configured to communicate with the SIM scheduling management system to acquire the appropriate SIM assigned by the SIM scheduling management system, and communicate with a service provider system corresponding to the appropriate SIM assigned by the SIM scheduling management system to acquire the service requested by the subscriber;
wherein the appropriate SIM is a smart card having the SIM function or SIM data.

According to the embodiments of the present invention, a subscriber acquires appropriate subscriber identity information, for example, SIM data, according to actual requirements, and implements sharing of services corresponding to individual or group subscriber identity information, thereby acquiring an international, any-network, any-service provider, any-technology and mode, or any-service (data, voice, video, and the like) network access service.

DETAILED DESCRIPTION OF THE INVENTION

To make the objective, technical solution, and advantages of the present invention more clear, the following section describes the technical solution of the present invention in combination with the accompanying drawings. It should be understood that the embodiments described here are only exemplary ones for illustrating the present invention, and are not intended to limit the present invention.

According to the embodiments of the present invention, subscriber identity information is automatically assigned to a subscriber according to actual requirements of the subscriber, such that the subscriber is capable of acquiring an international, any-network (any-service provider), any-technology and mode, and any-service network access service, and sharing of services corresponding to subscriber identity information, for example, SIM, of an individual or a group is implemented.

Figure 1:
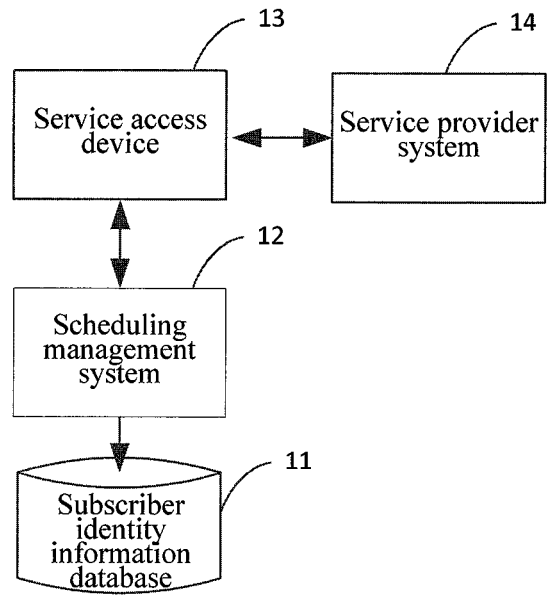
FIG. 1 is a schematic structural diagram of a service sharing system according to an embodiment of the present invention.

FIG. 1 illustrates a structure of a service sharing system according to an embodiment of the present invention. For ease of description, parts relevant to the embodiments of the present invention are only illustrated. The system comprises: a subscriber identity information database 11, a scheduling management system 12, and a service access device 13.

The subscriber identity information database 11 is configured to store subscriber identity information of a subscriber whose service is to be shared.

In the embodiments of the present invention, the subscriber identity information is used for a service provider to authenticate a subscriber, wherein the subscriber identity information comprises SIM data of a subscriber serviced by a mobile service provider, password corresponding to an instant messaging identifier of an instant messaging subscriber, password of a Wireless Fidelity (WiFi) subscriber, subscriber name and password of an x Digital Subscriber Line (xDSL) subscriber.

The scheduling management system 12 is configured to select appropriate subscriber identity information from the subscriber identity information database 11 according to the location of a user equipment and the type of a service requested by the subscriber, and assign the appropriate subscriber identity information to the subscriber.

In the embodiments of the present invention, the type of the requested service may be video, voice, data, or the like.

The service access device 13 is configured to communicate with a service provider system 14 corresponding to the subscriber identity information assigned by the scheduling management system 12 to acquire the service requested by the subscriber.

In the embodiments of the present invention, the subscriber identity information database 11 may be set in the scheduling management system 12, or may be independent of the scheduling management system 12 and called by the scheduling management system 12.

In the embodiments of the present invention, the service access device 13 communicates with a user equipment using, for example, USB, or may be built in the user equipment.

Figure 2:
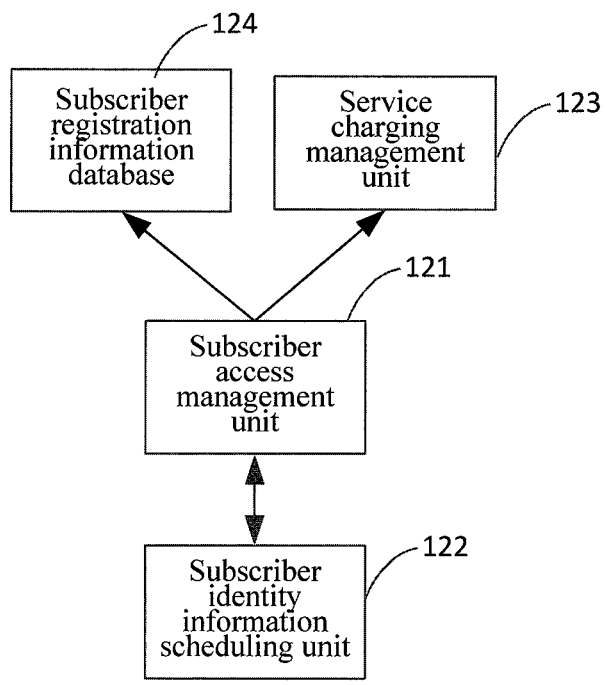
FIG. 2 is a schematic structural diagram of a scheduling management system according to an embodiment of the present invention.

FIG. 2 illustrates a structure of a scheduling management system according to an embodiment of the present invention. For ease of description, parts relevant to the embodiments of the present invention are only illustrated. The system comprises: a subscriber access management unit 121 and a subscriber identity information scheduling unit 122.

The subscriber access management unit 121 is configured to receive a service request from the service access device 13, and return subscriber identity information assigned to a subscriber to the service access device 13.

In the embodiments of the present invention, the service request carries the location of a user equipment and the type of the service requested by the subscriber.

The subscriber identity information scheduling unit is configured to search, according to the service request received by the subscriber access management unit 121, in the subscriber identity information database 11 to select the appropriate subscriber identity information and return the selected subscriber identity information to the subscriber access management unit 121.

In an embodiment of the present invention, for better implementation of sharing of the subscriber identity information, traffic and fees of the services acquired by the subscriber need to be management for settlement.

The scheduling management system 12 further comprises a service charging management unit 123 configured to manage service fee information of the subscriber accessing the subscriber access management unit 121.

In an embodiment of the present invention, the scheduling management system 12 further comprises a subscriber information database 124 configured to store registration information of the subscriber to perform identity verification for the subscriber initiating the service request.

Figure 3:
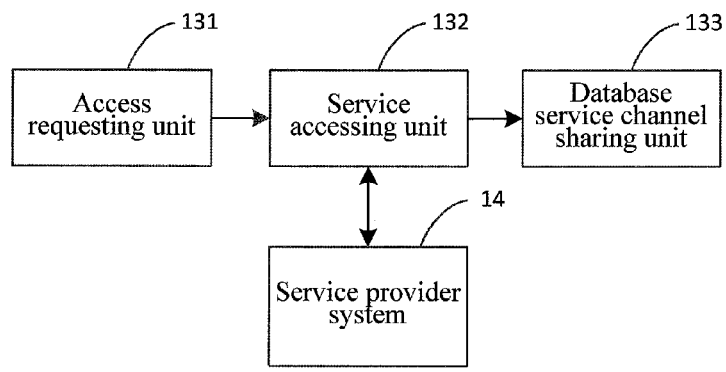
FIG. 3 is a schematic structural diagram of a service access apparatus according to an embodiment of the present invention.

FIG. 3 illustrates a structure of a service access device according to an embodiment of the present invention. For ease of description, parts relevant to the embodiments of the present invention are only illustrated. The system comprises: an access requesting unit 131 and a service access unit 132.

The access requesting unit 131 is configured to send a service request to the scheduling management system 12 and acquire subscriber identity information returned by the scheduling management unit.

The service access unit 132 is configured to communicate with the service provider system 14 corresponding to the subscriber identity information assigned by the scheduling management system 12 to acquire the service requested by the subscriber.

In the embodiments of the present invention, the service acquired by the service access unit 132 may comprise data, voice, or video services.

In a preferred embodiment of the present invention, the service access unit 132 communicates with a corresponding service provider system to acquire the requested service, wherein a communication channel over which the service is acquired may be shared to other devices using Bluetooth, WiFi, or Near Field Communication (NFC).

The data service sharing unit 133 is configured to provide a communication channel established between the service access unit 132 and the service provider system to another device.

In an embodiment of the present invention, the subscriber identity information may also be a smart card having the SIM function, for example, a physical SIM card, a USIM card, an R-SIM card or other such smart cards as implementing the SIM function.

In another embodiment of the present invention, the subscriber identity information may also be SIM data.

Figure 4:
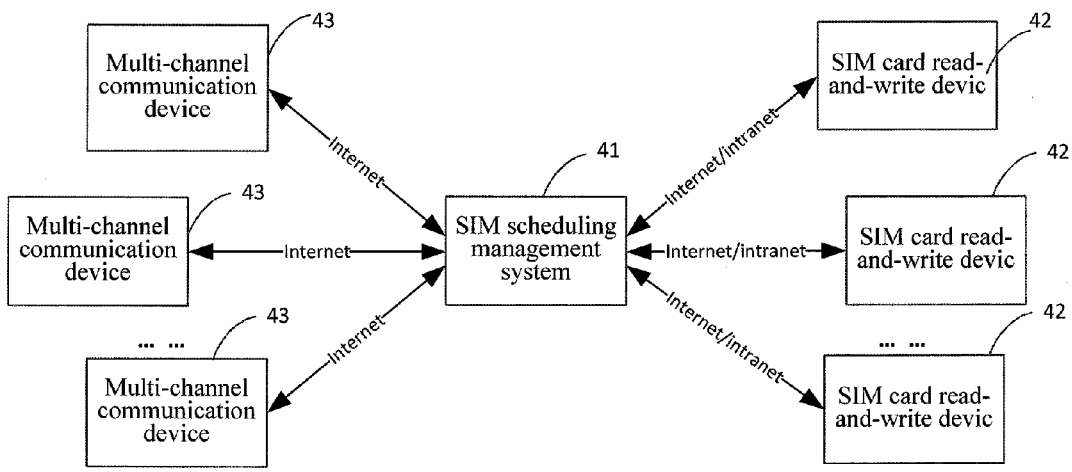
FIG. 4 is a schematic structural diagram of a SIM-based service sharing system according to an embodiment of the present invention.

FIG. 4 illustrates a structure of a SIM-based service sharing system according to an embodiment of the present invention. For ease of description, parts relevant to the embodiments of the present invention are only illustrated.

The system comprises: a SIM scheduling management system 41, at least one SIM card read-and-write device 42 in communication with the SIM scheduling management system 41, and at least one multi-channel communication device 43.

One or a plurality of SIM cards providing services may be inserted in each of the at least one SIM card read-and-write device 42.

In the embodiments of the present invention, depending on different applications, the SIM card read-and-write device 42 may be subject to three types of different specifications and capacities in terms of hardware.

The first type is based on a SIM rack of a large group, which is suitable for operation-level subscriber, supports read, write, and storage of several to tens of SIM cards, and implements wired or wireless large bandwidth communication.

The second type is based on a SIM array of a small group, which is suitable for enterprise-level subscriber, supports read, write and storage of tens of SIM cards, and implements wired or wireless large bandwidth communication.

The third type is based on a SIM box of an individual, which is suitable for an individual or a household subscriber, supports read, write and storage of one or a plurality of SIM cards providing service sharing, and implements the function of maintaining online during services in a wired or wireless communication mode.

In an embodiment of the present invention, the SIM box may be implemented by a dedicated terminal, or may be implemented using conventional terminals such as mobile phones and card readers under mating of clients.

In the embodiments of the present invention, the SIM card read-and-write device 42 needs to have the wired or wireless communication function, and have a bandwidth at least accommodating access of all SIM cards inserted therein.

In the embodiments of the present invention, the SIM card read-and-write device 42 may uniformly or separately deployed based on the Internet or Intranet.

In an embodiment of the present invention, the plurality of SIM card read-and-write device 42 may form a networked SIM card read-and-write system using the Internet or Intranet.

The SIM scheduling management 41 selects appropriate SIM from SIM cards inserted in the SIM card read-and-write device 42 according to the location of a user equipment and the type of a service requested by a subscriber, and in consideration of a network environment of the subscriber and subscriber attributes; and assigns the selected SIM to the subscriber, thereby implementing an international, any-network (any-service provider), any-technology and mode, any-service network access service for the subscriber, and implementing sharing of the services corresponding to individual or a group SIM.

The multi-channel communication device 43 is deployed at a user equipment side, and may be connected to a user equipment as an independent device or may be integrated with the user equipment.

In the embodiments of the present invention, the multi-channel communication device 43 may support read and write of one or a plurality of physical SIM cards, and communicate with the service provider system using the SIM assigned by the SIM scheduling management system 41 to acquire a service provided by the service provider system.

In the embodiments of the present invention, the multi-channel communication device 43 comprises at least two public network wireless channels, for example, 2G, 3G, 4G, WiFi, and Bluetooth, for establishing wide area network-based interconnection.

The multi-channel communication device 43 further comprises one or a plurality of WiFi, Bluetooth or NFC network channels for local area network-based interconnection.

In the embodiments of the present invention, the multi-channel communication device 43 logs in to a service provider system corresponding to the SIM card using the SIM card of the subscriber, establishes a network service provided by the service provider system, and establishes a 2G, 3G, 4G or WiFi-based mobile communication data channel, thereby implementing an Internet or Intranet-based network connection with the SIM scheduling management system. In this way, a management channel is established with the SIM scheduling management system 41, and communication with the SIM scheduling management system 41 is implemented.

The multi-channel communication device 43 may also implement the Internet or Intranet-based network connection with the SIM scheduling management system 41 over a network channel provided by a computer, a smartphone, or a Pad and using Bluetooth, WiFi, or NFC; establish a management channel with the SIM scheduling management system 41; and implement communication with the SIM scheduling management system.

The multi-channel communication device 43 may implement, for example, security verification of a subscriber, by connecting to the SIM scheduling management system 41 over the management channel.

After the management channel is established, the multi-channel communication device 43 communicates with the SIM scheduling management system 41, sends a service request to the SIM scheduling management system 41, and acquires the SIM assigned by the SIM scheduling management system 41.

In an embodiment of the present invention, the service request sent by the multi-channel communication device 43 to the SIM scheduling management system 41 may further comprise such information as signal strength of a base station servicing the user equipment, peripheral WiFi hotspot SSID information, and subscriber ID information, such that the SIM scheduling management system 41 selects more appropriate SIM for the subscriber.

The multi-channel communication device 43 implements an authentication with a service provider system corresponding to the SIM to establish a service channel with the service provider system, and communicates with the service provider system over the service channel to acquire a service requested by the subscriber.

In the embodiments of the present invention, after the multi-channel communication device 43 establishes the service channel, the management channel may be disabled or enabled.

In another embodiment of the present invention, the multi-channel communication device 43 may share services, especially data and voice services, acquired over the service channel to other devices using Bluetooth, WiFi, or NFC.

In the embodiments of the present invention, the multi-channel communication device 43 supports network access in network modes of almost all service providers in the world, for example, Global System for Mobile Communications (GSM), General Packet Radio Service (GPRS), Enhanced Data rates for GSM Evolution (EDGE), Code Division Multiple Access (CDMA), Enhanced Voice-Data Optimized (EVDO), Universal Mobile Telecommunications System (UMTS), Long Term Evolution (LTE), WiFi, fixed broadband, and cable network. In this way, the user equipment selects an appropriate access mode according to actual requirements, and thus enjoys services provided by different service providers from different countries in the world.

Figure 5:
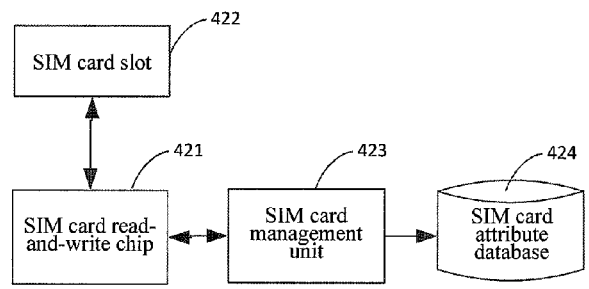
FIG. 5 is a schematic structural diagram of a SIM card read-and-write device according to an embodiment of the present invention.

FIG. 5 illustrates a structure of a SIM card read-and-write device 42 according to an embodiment of the present invention. For ease of description, parts relevant to the embodiments of the present invention are only illustrated.

The SIM card read-and-write device 42 comprises at least one SIM card read-and-write chip 421 and at least one SIM card slot 422, wherein one SIM card slot is connected to one SIM card read-and-write chip.

The SIM card read-and-write chip 421, under control of a SIM card management unit 423, implements read and write of a SIM card inserted in the SIM card slot 422.

The SIM card management unit 423 is configured to control read and write of the SIM card by the at least one SIM card read-and-write chip, and generate SIM card attribute information.

In the embodiments of the present invention, the SIM card management unit 423 detects whether the SIM card inserted in the SIM card slot 422 is in use, generates a slot location of the SIM card, and judges whether the SIM card is effective. Meanwhile, read and write of the SIM card are controlled, and the SIM card attribute information is generated.

In an embodiment of the present invention, the SIM card management unit 423 further records usage details of each SIM card.

In addition, the SIM card management unit 423 may further implement such functions as device alarming, parameter upload to the system, for example, parameters of temperature and port usage.

The SIM card attribute database 424 stores the SIM card attribute information generated by the SIM card management unit 423, comprising Integrated Circuit Card Identity (ICCID), International Mobile Subscriber Identification Number (IMSI), and Personal Identification Number (PIN).

Figure 6:
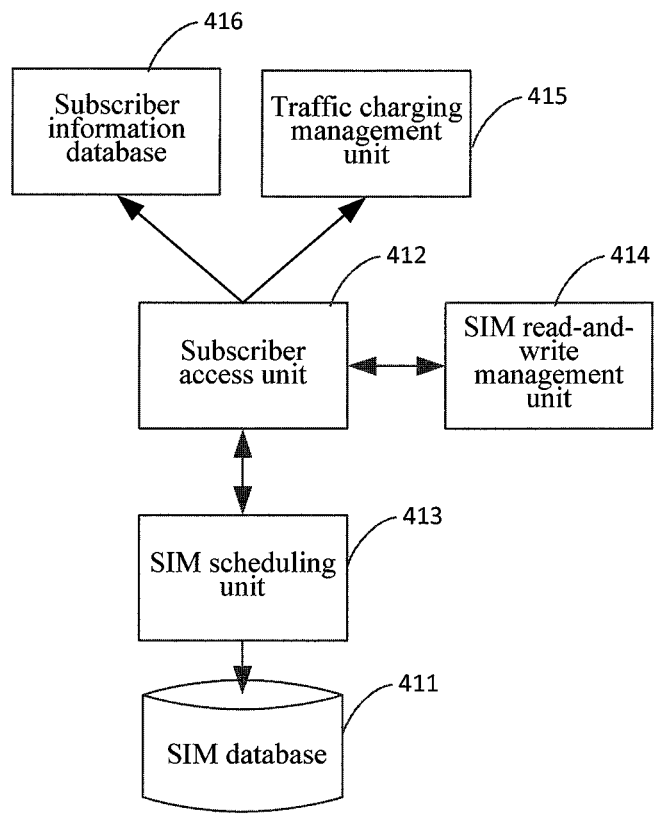
FIG. 6 is a schematic structural diagram of a SIM-based scheduling management system according to an embodiment of the present invention.

FIG. 6 illustrates a structure of a SIM scheduling management system according to an embodiment of the present invention. For ease of description, parts relevant to the embodiments of the present invention are only illustrated.

The system comprises: a SIM database 411, a subscriber access unit 412, and a SIM scheduling unit 413, SIM card read-and-write management unit 414, and a traffic charging management unit 415.

The SIM database 411 stores SIM data of the SIM card inserted on the SIM card read-and-write device, for example, SIM provided by a service provider system, Service Set Identifiers (SSIDs) of various WiFi services, user name and password for logging into a fixed service provider, and services corresponding to the SIM, including such information as data bandwidth, voice communication, and tariff package.

In an embodiment of the present invention, the SIM data stored in the SIM database 411 comprises various communication modes in different regions and of different service providers, and supports various services such as data, voice, short message, and video call services.

The subscriber access unit 412 receives a service request comprising the location of the user equipment and the type of the requested service that are received from the multi-channel communication device 43, and forwards the service request to the SIM scheduling unit 413.

The SIM scheduling unit 413 searches, according to the service request, in the SIM database to select appropriate SIM and assign the selected SIM to the subscriber, and returns a corresponding SIM card parameter to the subscriber access unit 412.

The subscriber access unit 412 returns the SIM card parameter assigned to the subscriber to the multi-channel communication device 43.

The multi-channel communication device 43 logs in to a corresponding service provider system using the SIM card parameter, and receives an authentication request from the service provider system, wherein the authentication request comprises an authentication data packet to be calculated by the SIM card, such as random numbers and authentication keys.

The multi-channel communication device 43 sends the authentication data packet to the calculated by the SIM card to the subscriber access unit 412.

The subscriber access unit 412 receives the authentication data packet of the SIM card parameter from the multi-channel communication device 43, and forwards the authentication data packet to the SIM card read-and-write management unit 414.

The SIM card read-and-write management unit 414 transfers the authentication data packet forwarded by the subscriber user access 412 to the SIM card read-and-write device 42, whereupon the SIM card read-and-write device 42 controls the corresponding SIM card to perform an authentication calculate, and returns a calculated authentication result to the subscriber access unit 412.

The subscriber access unit 412 returns the authentication result to the multi-channel communication device 43.

The multi-channel communication device 43 is successfully authenticated by the service provider system using the authentication result, establishes a service channel, and thus acquires the service requested by the subscriber over the service channel.

In an embodiment of the present invention, for better implementation of sharing of the subscriber identity information, traffic and fees of the services acquired by the subscriber need to be management for settlement.

The traffic charging management unit 415 is configured to manage information of communication traffic and service fees of a subscriber accessing the subscriber access management unit 412.

The SIM scheduling management system 41 may further comprise a subscriber information database 416 configured to store registration information generated when the subscriber registers in the SIM scheduling management system 41, wherein the registration information comprises, for example, account opening, account cancellation, and types of subscribed services.

Nevertheless, the subscriber information database 416 may be not set in the SIM scheduling management system 41, and may be queried or called by the SIM scheduling management system 41.

In an embodiment of the present invention, the subscriber access unit 412 may search in the subscriber information database 416 for registration information stored therein by the subscriber, and authenticates the subscriber requesting access.

Figure 7:
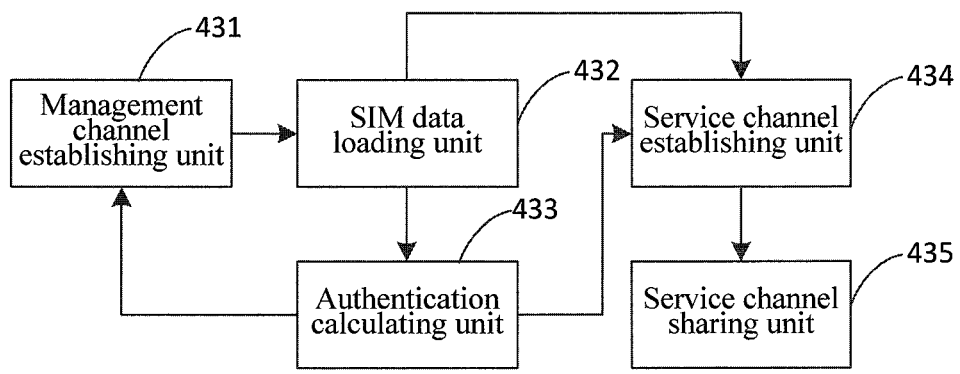
FIG. 7 is a schematic structural diagram of a SIM card read-and-write device according to an embodiment of the present invention.

FIG. 7 illustrates a structure of a multi-channel communication device 43 according to an embodiment of the present invention. For ease of description, parts relevant to the embodiments of the present invention are only illustrated. The multi-channel communication device 43 comprises: a management channel establishing unit 431, a SIM data loading unit 432, an authentication calculating unit 433, and a service channel establishing unit 434.

In the embodiments of the present invention, the multi-channel communication device 43 has at least capabilities of establishing a management channel and a service channel.

The management channel establishing unit 431 communicates with a corresponding service provider system using a SIM card inserted in the multi-channel communication device 43, implements an Internet or Intranet-based connection with the SIM scheduling management unit 41 using a network service provided by the service provider system, and thus establish a management channel with the SIM scheduling management system 41.

In an embodiment of the present invention, during specific implementation, the management channel establishing unit 431 comprises at least one SIM card slot and a SIM card read-and-write chip connected to the at least one SIM card slot, wherein a SIM card of the subscriber may be inserted into the SIM card slot. The multi-channel communication device 43 communicates with the corresponding service provider system using the SIM card, and establishes a communication channel with the SIM scheduling management system 41, wherein the established communication channel serves as a management channel.

In an embodiment of the present invention, the multi-channel communication device 43 may also communicate with the corresponding service provider system over other networks such as a WiFi network, a cable network, or a local area network, and establish the management channel.

The SIM data loading unit 432 is configured to perform the same SIM-specific operations as inserting a local physical SIM card, send such service request information as the location of the user equipment and the type of the requested service to the SIM scheduling management system 41 over the management channel, and receive the SIM card parameter assigned by the SIM scheduling management system 41 to the subscriber, thereby implementing remote call and local load of the SIM data.

The authentication calculating unit 433 is configured to communicate with the corresponding service provider system using the SIM card parameter, and receive an authentication request from the service provider system, wherein the authentication request comprises an authentication data packet comprising, for example, random numbers and authentication keys.

The authentication calculating unit 433 sends the authentication data packet to the SIM scheduling management system 41 over the management channel, and receives the authentication result from the SIM scheduling management system 41.

The service channel establishing unit 434 is configured to establish a service channel by communicating with a service provider system corresponding to the SIM card parameter according to the SIM card parameter received by the SIM data loading unit 432 and the authentication result received by the authentication calculating unit 433.

In a preferred embodiment of the present invention, the multi-channel communication device 43 may further comprise a service channel sharing unit 435, configured to share the service channel established by the service channel establishing unit 434 with the service provider system to other devices. The service channel sharing unit 435 may share, over at least one network interface provided on the multi-channel communication device 43, services acquired over the service channel, such as the Internet data access service, to other devices using Bluetooth, WiFi, and NFC.

In another embodiment of the present invention, an individual or a group subscriber inserts a SIM card into the SIM card read-and-write device 42 (SIM rack, SIM array, or SIM box) or the multi-channel communication device 43, where the SIM card serves as SIM that can be scheduled by the SIM scheduling management system 41. When another subscriber dynamically schedules the SIM using the SIM scheduling management system 41, all services corresponding to the SIM within a time period may be acquired, thereby implementing sharing of the SIM.

In the embodiments of the present invention, the SIM card for sharing may be provided by an individual or a group subscriber using various SIM card devices. For example, an individual subscriber may select to insert a SIM card thereof in the multi-channel communication device 43, and the group subscriber may insert a batch of SIM cards thereof using the SIM card read-and-write device 32.

The physical SIM card inserted in the SIM card read-and-write device 42 is not subject to countries and service providers. All the physical SIM card information and such relevant service information as package and tariff are uniformly managed, scheduled and assigned by the SIM scheduling management system 41.

The SIM scheduling management server 41 may acquire a sharing setting request, including geographic location, service type, price, time period, and sharing target (specified subscriber), from an individual or a group using a client on the SIM card read-and-write device 42, a personal computer, a smartphone, a tablet computer, and a multi-channel communication device 43.

The SIM scheduling management system 41 automatically implements charging, settlement and accounting for SIM card sharing according to the usage details.

Detailed description is given as follows using sharing of SIM of an individual as an example.

Firstly, the subscriber is registered in the SIM scheduling management system as a user of the system, and one or a plurality of SIM cards are inserted using the SIM card read-and-write device 42 (SIM box) used by the individual subscriber.

Secondly, the SIM box accesses a computer capable of accessing the Internet, ensuring successful Internet access within a time period of the SIM service, or the SIM card for sharing is inserted into the multi-channel communication device 43, and accesses the Internet using the multi-channel communication device 43 in a plurality of access modes such as WiFi, 2G, 3G, and 4G.

Subsequently, the subscriber runs the client on the computer, the smartphone, or the multi-channel communication device 43, sets SIM card attributes, and provides a time period for SIM sharing. The client automatically registers a local IP address (a static IP address and a dynamic IP address are supported) and corresponding SIM card attribute information, a service ID of the accessible Internet, for example, WiFi hotspot information, and a cable service provider, to the SIM scheduling management system 41.

The SIM scheduling management system 41 automatically schedules and assigns, according to actual requirements of other subscribers, the SIM to the other subscribers for providing services.

The subscriber may check usage details, including shared traffic, of the provided services by running the client on the computer, the smartphones, or the multi-channel communication device 43.

In an embodiment of the present invention, the subscriber may also share the SIM using the multi-channel communication device 43.

The subscribers, wherever they go, firstly establishes a connection with the SIM scheduling management system 41 using the multi-channel communication device 43 in such a mobile access mode as 2G, 3G, or 4G mobile access, or establishes a connection with the SIM scheduling management system 41 using another Internet access-capable device in such a communication mode as Bluetooth or WiFi.

The multi-channel communication device 43 uploads various local position-based information of the service provider, for example, MNC, signal strength, and WiFi SSID, and the subscriber ID registered by the subscriber in the SIM scheduling management system 41 to the SIM scheduling management system 41.

The SIM scheduling management system 41 schedules appropriate SIM according to the information uploaded by the multi-channel communication device 43, and downloads the SIM to a multi-channel access-capable communication terminal.

The multi-channel communication device 43 automatically accesses the corresponding service provider using the downloaded SIM, establishes an Internet-based connection or a service provided by another SIM, and enables other communication terminals of the subscriber, such as a mobile phone, a Pad, and a computer, to access, using such service channel sharing unit as WiFi, Bluetooth, NFC, and USB, the Internet or such services provided by the service provider as voice, data, video call services.

The subscriber may further check usage details, including used traffic, credit on the SIM scheduling management system 41, and the like, of the services enjoyed by the subscriber using a client provided by the SIM scheduling management system. The client may also run on a computer, a smartphone, or a multi-channel communication device 43.

Figure 8:
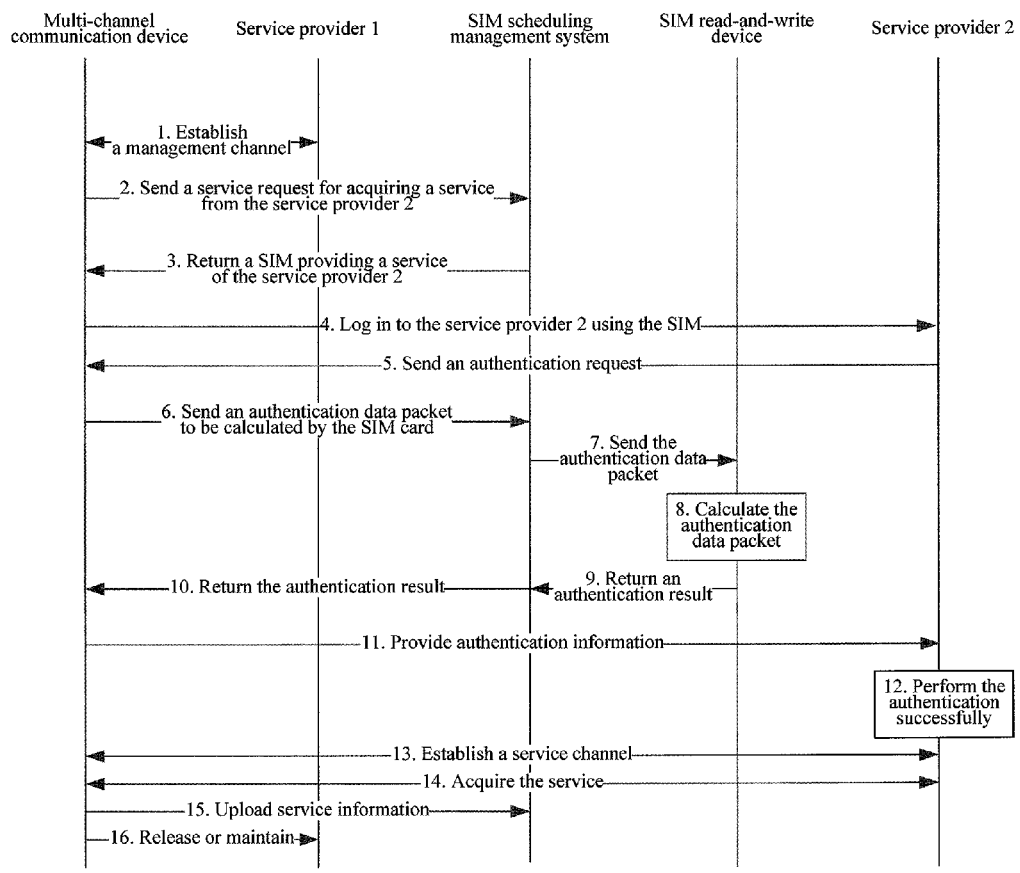
FIG. 8 is a flowchart of SIM-based sharing according to an embodiment of the present invention.

FIG. 8 is a flowchart of SIM-based sharing according to an embodiment of the present invention.

1. The multi-channel communication device communicates with a service provider 1 corresponding to the inserted SIM card to acquire a network access service provided by the service provider 1, and establishes a management channel.

2. The multi-channel communication device communicates with the SIM scheduling management system over the management channel, and sends a service request to a service provider 2, wherein the service request comprises the current location of the subscriber and the type of a requested service.

3. The SIM scheduling management system returns SIM providing services of the service provider 2 to the multi-channel communication device.

4. The multi-channel communication device logs in to the service provider 2 using the SIM assigned by a server.

5. The service provider 2 returns an authentication request comprising an authentication data packet to be calculated by the corresponding SIM card such as random numbers and authentication keys to the multi-channel communication device.

6. The multi-channel communication device sends the authentication data packet to be calculated by the SIM card to the SIM scheduling management system over the management channel.

7. The SIM scheduling management system sends the authentication data packet to the corresponding SIM card read-and-write device.

8. The SIM card read-and-write device controls the corresponding SIM card to calculate the authentication data packet to acquire an authentication result.

9. The SIM card read-and-write device returns the authentication result to the SIM scheduling management system.

10. The SIM scheduling management system returns the authentication result to the multi-channel communication device.

11. The multi-channel communication device sends authentication information to the service provider 2.

12. The service provider 2 performs the authentication successfully 18629600116.

13. The multi-channel communication device establishes a service channel with the service provider 2.

14. The multi-channel communication device acquires the service provided by the service provider 2 over the service channel.

15. The multi-channel communication device uploads service information to the SIM scheduling management system over the management channel.

16. The multi-channel communication device releases or maintains the services provided by the service provider 1.

Figure 9:
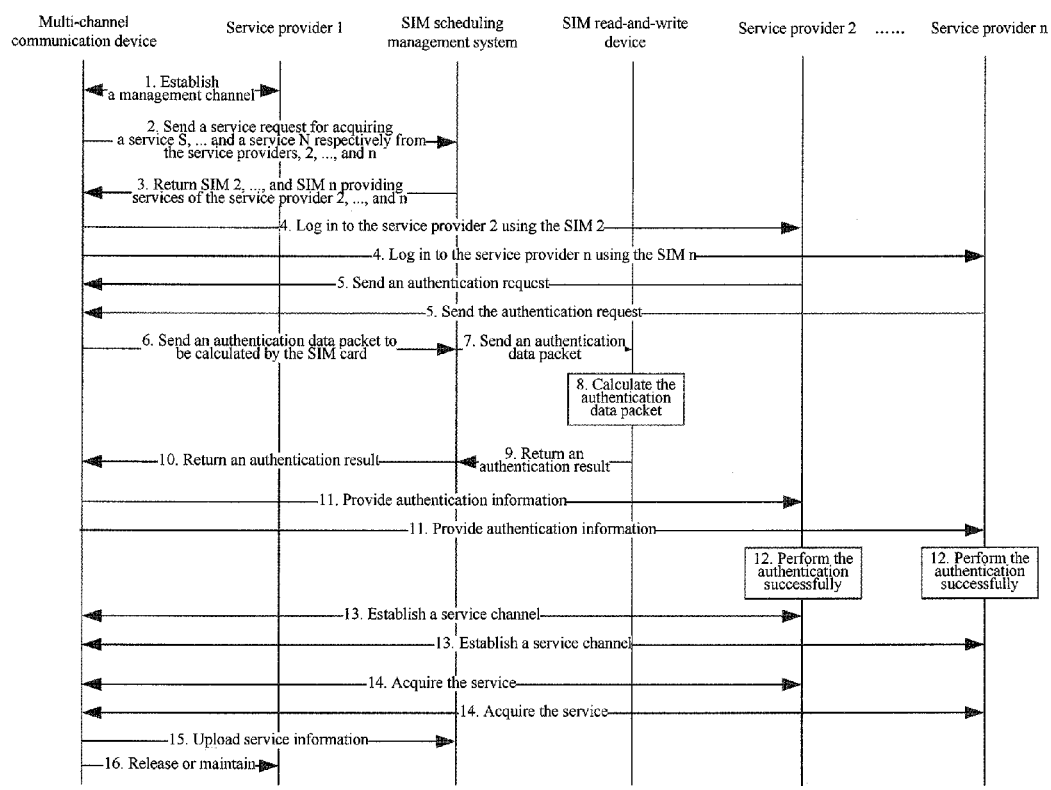
FIG. 9 is a flowchart of a process that a subscriber acquires a combination of various services of a plurality of SIM cards according to an embodiment of the present invention.

In an embodiment of the present invention, the subscriber may load a plurality of SIMs using the multi-channel communication device 43, acquire a dynamic combination of different services of the plurality of SIMs as required, for example, a voice service of SIM 1, a data service of SIM 2, an MMS service and a video service of SIM 3, and a music service and an e-book service of SIM 4. FIG. 9 illustrates the implementation flowchart.

1. The multi-channel communication device communicates with a service provider 1 corresponding to the inserted SIM card to acquire a network access service provided by the service provider 1, and establishes a management channel.

2. The multi-channel communication device communicates with the SIM scheduling management system over the management channel, and sends a service request for acquiring a service S2 provided by the service provider 2, a service S3 provided by the service provider 3, . . . , and a service n provided by the service provider n, wherein the service request comprises the current location of the subscriber and types of the various services provided by the service providers.

3. The SIM scheduling management system returns the SIM 2 providing a service of the service provider 2, the SIM 3 providing a service of the service provider 3, . . . , and the SIM n providing a service of the service provider n to the multi-channel communication device.

4. The multi-channel communication device respectively logs in to the service providers 2, 3, . . . , and n using the SIM 2, SIM 3, . . . , and SIM n assigned by a server.

5. The service providers 2, 3, and n respectively return an authentication request comprising an authentication data packet to be calculated by the corresponding SIM card such as random numbers and authentication keys to the multi-channel communication device.

6. The multi-channel communication device sends the authentication data packet to be calculated by the SIM card to the SIM scheduling management system over the management channel.

7. The SIM scheduling management system sends the authentication data packet to the corresponding SIM card read-and-write device.

8. The SIM card read-and-write device controls the corresponding SIM card 2, SIM card 3, . . . , SIM card n to calculate the authentication data packet to acquire an authentication result.

9. The SIM card read-and-write device returns the authentication result to the SIM scheduling management system.

10. The SIM scheduling management system returns the authentication result to the multi-channel communication device.

11. The multi-channel communication device sends the authentication result to the service providers 2, 3, . . . , and n respectively.

12. The service providers 2, 3, . . . , and n perform the authentication successfully.

13. The multi-channel communication device establishes a service channel with the service providers 2, 3, . . . , and n respectively.

14. The multi-channel communication device acquires the services provided by the service providers 2, 3, . . . , and n over the service channels established with the service providers.

15. The multi-channel communication device uploads service information to the SIM scheduling management system over the management channel.

16. The multi-channel communication device releases or maintains the services provided by the service provider 1.

According to the embodiments of the present invention, a subscriber acquires appropriate subscriber identity information, for example, SIM data, according to actual requirements, and implements sharing of services corresponding to individual or group subscriber identity information, thereby acquiring an international, any-network, any-service provider, any-technology and mode, or any-service (data, voice, video, and the like) network access service.

Persons of ordinary skill in the art may understand that all or part of the steps of the methods in the embodiments may be implemented by a program instructing relevant hardware. The program may be stored in a non-transitory computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

The above descriptions are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A subscriber identity module (SIM)-based service sharing system, comprising:
    at least one SIM card read-and-write device, configured to simulate a read-and-write process performed by a local user equipment of a SIM card providing service sharing to a physical SIM card, wherein at least one SIM card providing service is insertable in the at least one SIM card read-and-write device;
    a SIM scheduling management system configured to select appropriate SIM from the at least one SIM card inserted in the at least one SIM card read-and-write device according to the location of a user equipment and the type of a service requested by a subscriber, and assign the appropriate SIM to the subscriber; and
    at least one multi-channel communication, configured to communicate with the SIM scheduling management system to acquire the appropriate SIM assigned by the SIM scheduling management system, and communicate with a service provider system corresponding to the appropriate SIM assigned by the SIM scheduling management system to acquire the service requested by the subscriber;
    wherein the appropriate SIM is a smart card having the SIM function or SIM data;
    the SIM scheduling management system comprises:
    a SIM database configured to store SIM data on the at least one SIM card of the at least one SIM card read-and-write device;
    a subscriber access unit configured to receive a service request from the multi-channel communication device, return the SIM card parameter assigned to the subscriber to the multi-channel communication device, receive an authentication data packet of the SIM card parameter from the multi-channel communication device, and return a corresponding authentication result to the multi-channel communication device;
    a SIM scheduling unit, configured to search, according to the service request received by the subscriber access management unit, in the SIM database data to select appropriate SIM, and return a corresponding SIM card parameter to the subscriber access management unit; and
    a SIM card read-and-write management unit, configured to transfer the authentication data packet of the SIM card parameter received from the subscriber access management unit to the at least one SIM card read-and-write device, and return an authentication result calculated by the at least one SIM card read-and-write device to the subscriber access management unit.

2. The SIM-based service sharing system according to claim 1, wherein each of the at least one SIM card read-and-write device comprises:
    at least one SIM card read-and-write chip;
    at least one SIM card slot, each of the at least one SIM card slot being connected to one of the at least one SIM card read-and-write chip;
    a SIM card management unit, configured to control read and write of the SIM card by the at least one SIM card read-and-write chip, and generate SIM card attribute information; and
    a SIM card attribute database, configured to store the SIM card attribute information generated by the SIM card management unit.

3. The SIM-based service sharing system according to claim 1, wherein the SIM scheduling management system further comprises:

a traffic charging management unit, configured to manage information of communication traffic and service fees of a subscriber accessing the subscriber access management unit.

4. The SIM-based service sharing system according to claim 1, wherein the SIM scheduling management system further comprises:

a subscriber registration information database, configured to store registration information of the subscriber.

5. The SIM-based service sharing system according to claim 1, wherein the multi-channel communication device comprises:

a management channel establishing unit, configured to establish a management channel by communicating with the service provider system corresponding to the SIM of the subscriber;

a SIM data loading unit, configured to send a service request from the subscriber to the SIM scheduling management system over the management channel, and receive a SIM card parameter assigned by the SIM scheduling management system to the subscriber;

an authentication calculating unit, configured to send the SIM card parameter to the service provider system over the management channel, receive an authentication request from the service provider system, send an authentication data packet to the SIM scheduling management system, and receive an authentication result from the SIM scheduling management system; and a service channel establishing unit, configured to establish a service channel by communicating with a service provider system corresponding to the SIM card parameter according to the SIM card parameter received by the SIM data loading unit and the authentication result received by the authentication calculating unit.

6. The SIM-based service sharing system according to claim 5, wherein the multi-channel communication device further comprises:

a service channel sharing unit, configured to provide a service channel established by the service channel establishing unit with the service provider system to another device.

\* \* \* \* \*